US 6,568,762 B2

(12) United States Patent
Porcheron

(10) Patent No.: US 6,568,762 B2
(45) Date of Patent: May 27, 2003

(54) LOCKING SYSTEM FOR BODY SUPPORT DEVICE FOR STAND-UP WHEELCHAIR

(75) Inventor: Francois Porcheron, Lyons (FR)

(73) Assignee: IDC Medical, Beynost (FR)

( * ) Notice: Subject to any disclaimer, the term of this patent is extended or adjusted under 35 U.S.C. 154(b) by 0 days.

(21) Appl. No.: 09/946,813

(22) Filed: Sep. 6, 2001

(65) Prior Publication Data

US 2002/0027385 A1 Mar. 7, 2002

(30) Foreign Application Priority Data

Sep. 7, 2000 (FR) .......................... 2000 11412

(51) Int. Cl.⁷ .............................................. A47C 31/00
(52) U.S. Cl. ............. 297/466; 297/423.11; 297/DIG. 4; 403/321; 403/322.1; 403/324
(58) Field of Search ............................. 297/466, 423.11, 297/423.37, 487, 488, DIG. 4; 403/322.1, 322.2, 322.3, 321, 324, 325

(56) References Cited

U.S. PATENT DOCUMENTS

| | | | | |
|---|---|---|---|---|
| 1,394,464 A | * | 10/1921 | Bentley ........................ 16/380 |
| 2,755,101 A | * | 7/1956 | Budde ........................ 280/748 |
| 4,054,319 A | * | 10/1977 | Fogg et al. .................. 297/330 |
| 4,243,342 A | * | 1/1981 | Marto .......................... 280/515 |
| 4,506,930 A | * | 3/1985 | Lambert ................. 297/423.11 |
| 4,623,194 A | * | 11/1986 | Pillot ......................... 297/316 |
| 4,626,125 A | * | 12/1986 | Hoshino ...................... 403/324 |

* cited by examiner

*Primary Examiner*—Peter M. Cuomo
*Assistant Examiner*—Stephen D'Adamo
(74) *Attorney, Agent, or Firm*—Dennison, Schultz & Dougherty

(57) ABSTRACT

Aid for handicapped persons.
The locking system is characterised in that:
  The additional elements are constituted by half nuts (70, 71) shaped in such as way as to provide in their cooperation position a tenon (92) and mortice type assembly inside an approximately horizontal plane,
  One of the two half nuts delimits in the tenon (92) an open housing with an axis perpendicular to the assembly plane and into which projects a guiding chute opening towards the front,
  And the other half nut bears an elastic return thrustor (78) traversing the mortice along a direction perpendicular to the assembly plane and forming a body (79) able to be engaged in the housing and a neck (82) to fully traverse the corridor.
Application for stand-up wheelchairs.

16 Claims, 5 Drawing Sheets

LOCKING SYSTEM FOR BODY SUPPORT DEVICE FOR STAND-UP WHEELCHAIR

The present invention concerns wheelchairs used by handicapped persons and invalids and relates to self-propelled chairs and possibly folding chairs.

The object of the invention concerns more particularly wheelchairs of the type comprising an articulated structure including a back portion, a seat and a foot-rest associated with a motor element for assisting or ordering the lifting or lowering of the articulated structure with respect to a carrying frame.

These wheelchairs undoubtedly represent real progress as, apart from providing essential mobilisation, they enable the occupant to be rendered vertical which is also essential so as to avoid physical discomfort arising from remaining too long in a seated position.

The prior art offers a certain number of solutions for embodying wheelchairs comprising an articulated stand-up structure.

These various solutions have advantages and drawbacks, but generally speaking make it possible to correctly render an occupant standing up correctly.

However, it has been observed that these wheelchairs could not have been used by all handicapped persons or invalids. In fact, for certain handicapped or disabled persons, the occupant concerned does not have or no longer sufficient has muscular control to remain in a stable position against the stand-up support plane represented by the raised articulated structure of a wheelchair.

In these cases, remaining upright represents a real danger for the occupant who, without possessing physical control, risks falling by being moved sideways or by the bending of the legs or even by weakening of the torso.

Now the possibility of remaining upright is important for all handicapped persons or invalids and even more so for those not possessing physical control such as in the cases mentioned above.

In order to resolve this problem, it has been suggested, in particular in the patent FR 83 08 201, to adapt a body support device on these wheelchairs, said device including:

A first set of means comprising two partly bent rigid segments each mounted laterally on the corresponding upright of the back portion by an articulated system and able to be arranged:

Along a general vertical orientation in which they represent side rail armrests for an occupant, Or along a general horizontal orientation in which they constitute a thoracic strap for the occupant, And a second set of means including two cradles mounted by hinge pins on the front uprights of the foot-rest unit, said cradles being associated with relative immobilisation means in an alignment position in which they constitute open elastic stockings nesting via the front the legs of an occupant.

The means described above shall be considered as able to essentially respond to the problem of an occupant being moved to a standing position and supported in the phases for lifting up and lowering the articulated structure so that the body of said occupant is suitably supported safely.

The backward movement, now available concerning the use of these stand-up wheelchairs, has however revealed the need to improve some of the technical means implemented to provide body support and more particularly the technical means relating to the second set and intended to ensure locking on bending of the lower limbs of the occupant by the immobilisation of the legs immediately below the joint of the knees.

In fact, it has been observed that the relative immobilisation means in a position of the alignment and nesting of the open elastic stockings did not provide all the safety required and essential for reasons due to their design.

These immobilisation means are sometimes rudimentary and thus advantageous on account of their simplicity concerning their design and handling, but on the other hand are dangerous for the safety of a sick person, especially in a standing up position given the fact that there is a possibility or risk of said means being opened at the wrong time.

Other mobilisation means basically seek to eliminate this major drawback and are then designed so complex as to be expensive in terms of design and upkeep and in particular are difficult to be activated in a practical and ergonomic way by a handicapped person or invalid.

Furthermore, so as to offer full safety to an occupant when standing up, it has been observed that it is essential to take into account a risk of incorrect handling of the locking means and taking account of this to nevertheless introduce in some way to a second degree a passive element of safety to guarantee at least partial safety should the mobilisation means open at an inopportune moment.

Thus, the object of the invention is to satisfy this need for improving the immobilisation means of the open elastic stockings so that these means are effective, can be easily activated, are reliable and being of the kind to further offer an additional passive safety for supporting the elastic stockings in a nesting position, even if, although unlikely, these immobilisation means are manoeuvred at the wrong moment or rendered defective to the point of resulting of causing an unintentional opening.

So as to attain this objective, the locking system for a body support device for a stand-up wheelchair including a chassis supporting an articulated structure composed of a seat, a back portion and a foot-rest associated with two open elastic stockings constituted by two cradles borne by supports having an articulation function via tilting on the foot-rest and a linking function by means of a locking system intended to firstly immobilise between them said supports in a position in which the elastic stockings house the legs of a sick person, and secondly enable the supports to be opened, said supports being constituted by two frames forming two tilting arms and two frontal arms provided at the end of additional fundamental elements of the locking system, is characterised in that:

the additional elements are constituted by half nuts shaped so that in their co-operation position to give rise to a mortise and tenon type assembly inside in an approximately horizontal plane, One of the half nuts delimits inside the tenon an open housing with an axis perpendicular to the assembly plane and into which a guiding chute projects opening towards the front, And the other half nut bears an elastic return thrustor traversing the mortise along a direction perpendicular to the assembly plane and forming a body able to be engaged in the housing and a neck for traversing the chute.

Other miscellaneous characteristics are contained in the following description with reference to the accompanying drawings which show, by way of non-restrictive examples, embodiments of the object of the invention.

Figure 11:
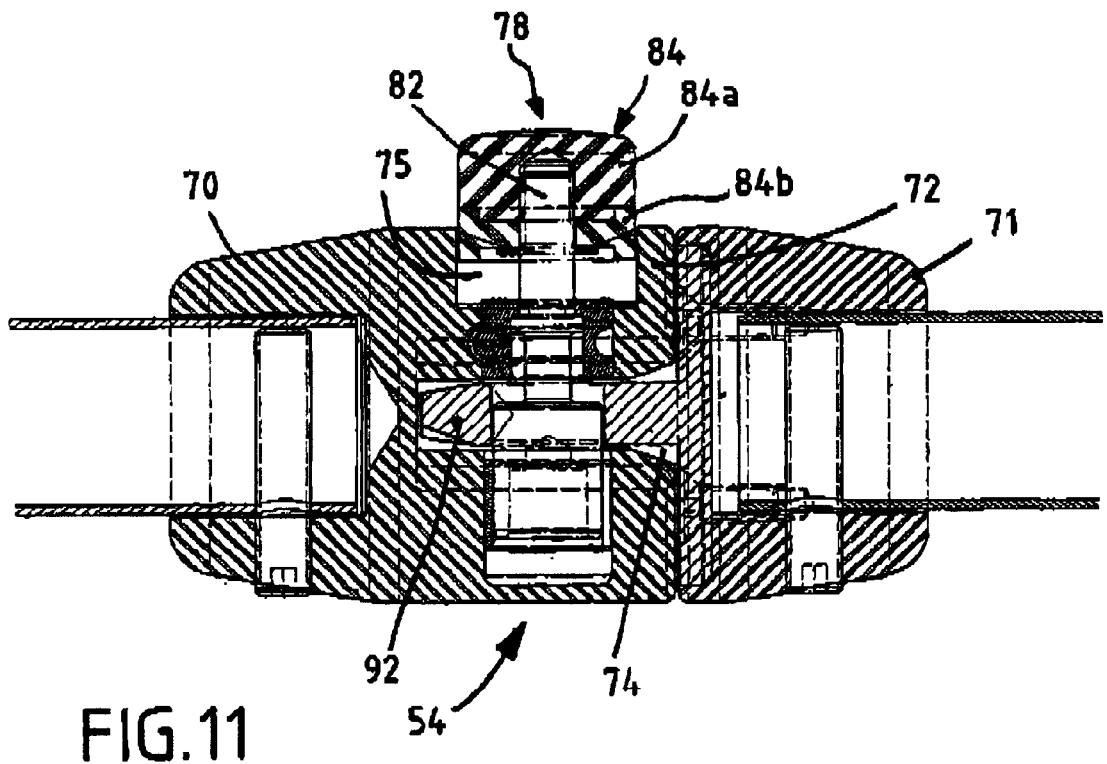

FIGS. 11 et 12 are two elevation sections illustrating one embodiment details of an execution variant of the object of the invention.

Figure 1:
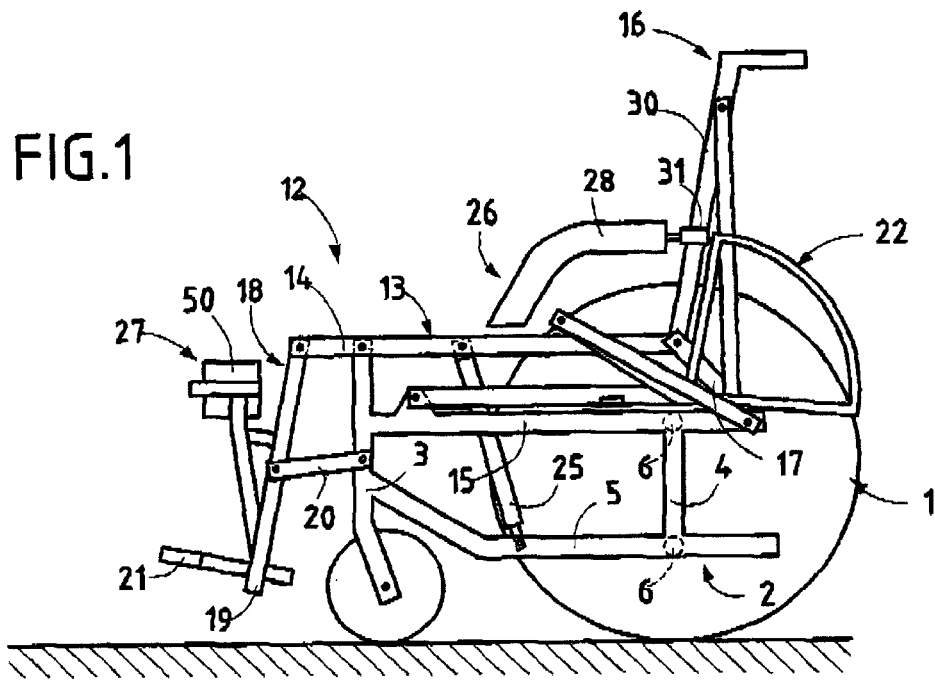
FIGS. 1 and 2 are diagrammatic views of a wheelchair including an articulated stand-up structure associated with a body support device and illustrate the seated and stood-up positions this structure is able to adopt.
Figure 2:
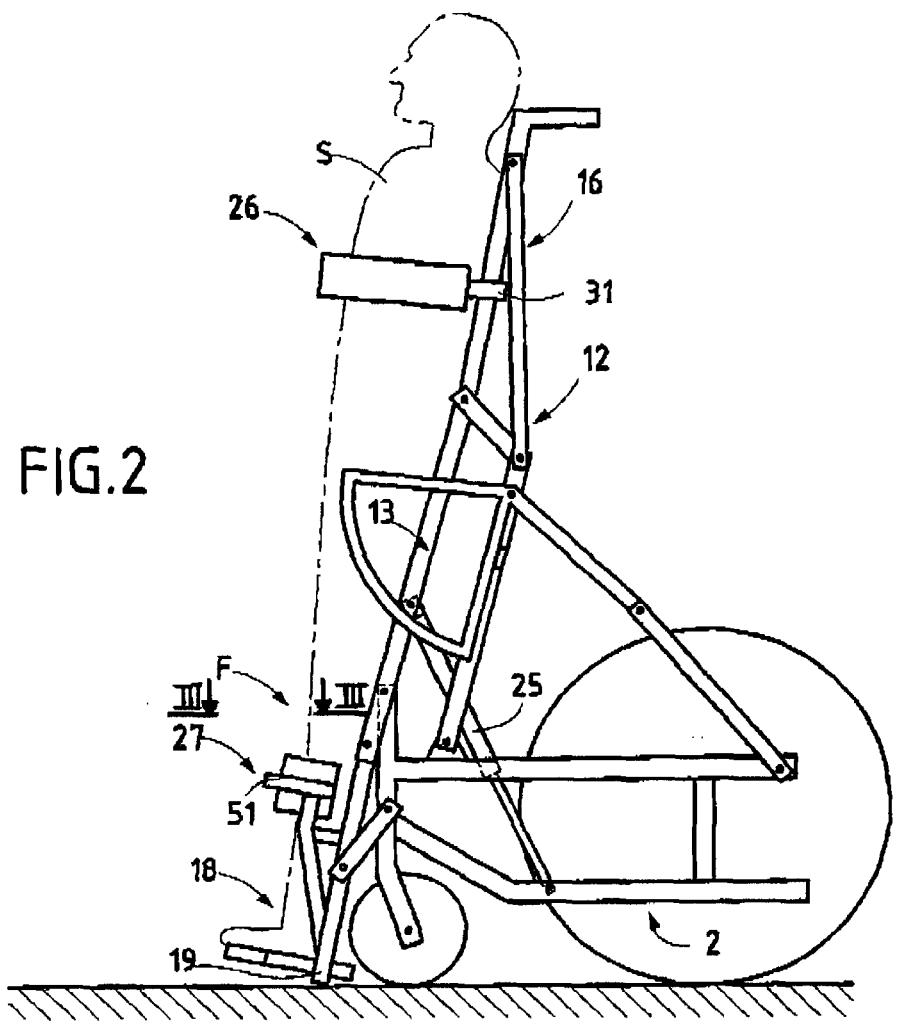

So as to help in understanding the object of the invention, FIGS. 1 and 2 diagrammatically refer to a rotating wheelchair 1 which can be folded and including a chassis 2 constituted by front 3 and rear uprights 4 interconnected by longitudinal girders 5 and cross members 6.

The chassis 2 is equipped with an elevating articulated structure 12 intended to enable an occupant S to stand upright. This structure 12 generally includes a seat 13 composed of longitudinal girders 14 and 15 joined to the front portion of the chassis 2. The structure 12 further includes a back portion 16 joined onto the longitudinal girders 14 and 15, for example with the aid of rocker bars 17. The articulated structure 12 is completed by foot-rest unit 18 including two front uprights 19 joined onto the longitudinal girders 14 and onto the uprights 3 of the chassis 2 by two rocker bars 20. The unit 18 supports a known type of one or two foot-rests 21.

The articulated structure 12 in connected to the chassis 2 by two control assemblies 22 able to immobilise via geometrical locking the articulated structure 12 in a stable seated position according to FIG. 1 or in a stable raised standing up position according to FIG. 2. The control assemblies 22 are completed by at least one motor element 25, such as a spring or gas thrustor, inserted between the chassis 2 and, for example, the seat 13.

FIG. 2 shows the existing articulation relation between the seat 13, the back portion 16 and the foot-rest unit 18, stressed on moving upwards by the control assemblies 22 and the motor element(s) 25.

So as to physically support an occupant S, as shown by the dot-and-dash lines in the stand-up position according to FIG. 2, a device is provided to make up for the lack or absence of physical control of the occupant S and keep the latter completely safe in the stable stand up position. This physical support device includes a first set of means 26 intended to be adapted on the back portion, and a second set of means 27 intended to be adapted on the foot-rest unit 18.

The first set of means 26 includes two rigid segments 28 mounted on the corresponding uprights 30 of the back portion by an articulated system 31. By means of this system, the two segments can be placed inside two vertical lateral planes so as to play the role of two rail armrests (FIG. 1) or inside an approximately horizontal plane (FIG. 2) to play the role of a thoracic strap surrounding the chest of an occupant S placed in a stand up position.

Figure 3:
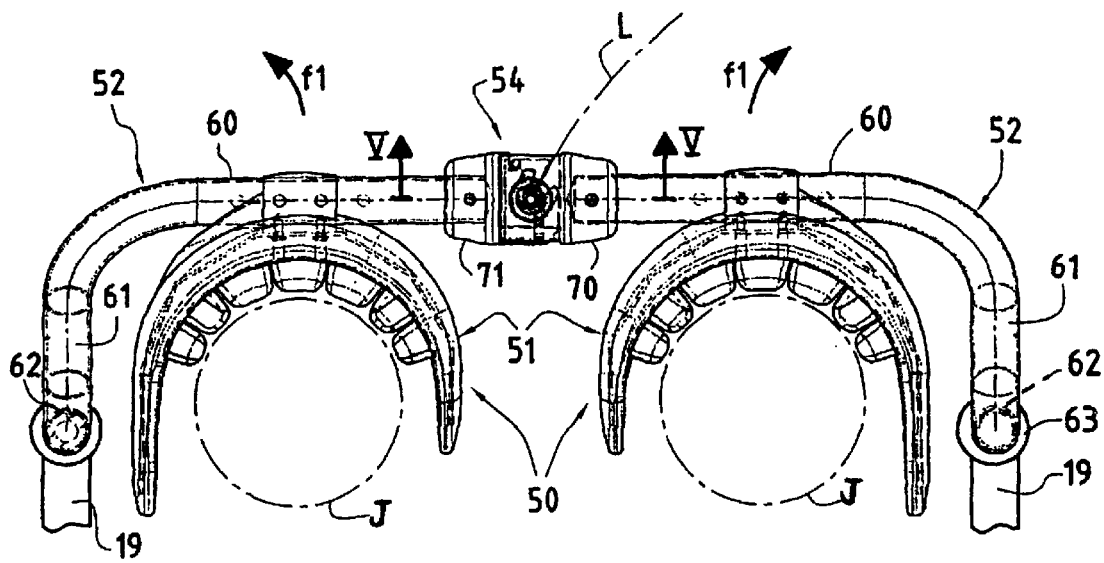
FIG. 3 is a bird's eye view taken on larger scale along the line III—III of FIG. 2.

The second set of means 27 includes two open elastic stockings 50 for covering via the front the legs of an occupant so as to take support approximately below the tibial plate and thus immobilise the lower limbs laterally and inside the antero-posterior plane. To achieve this, each elastic stocking includes a cradle 51 borne by a support 52 which is joined tilting to the front portion of the front upright 19 (FIG. 3). In this way, the elastic stockings can occupy cancellation position on being tilted in the direction of the arrows $f_1$ (FIG. 3) or a functional position by being aligned and immobilised by a locking device 54 in and which they nest the legs J of the occupant S so as to constitute frontal stops opposing a bending of the legs of the occupant.

So as to suitably provide the functionality transmitted to them, the means 27 include for each elastic stocking 50 a cradle 51 which is mounted on a support 52 embodied in the form of a member including a frontal arm 60, an intermediate portion 61 and an arm 62 with a general vertical orientation (FIG. 3 et 4). The arm 62 is intended to co-operate with a pivot 63 with a general vertical axis x–x' borne, mounted, formed or constituted otherwise by the corresponding upright 19 of the foot-rest 18. The association of the pivoting arm 62 with the pivot 63 is preferably effected by a vertical telescopic engaging which makes it possible to have the member 52 removed by means of vertical extraction and reconfigured by a reversed movement.

So as to provide full safety in locking the elastic stockings in a physical support position, the improvements of the invention introduce the following means.

The members 52 are interconnected in the nesting position of the elastic stockings 51 by means of the locking system 54 which introduces two additional half nuts 70 and 71 which are adapted on the end portions of the frontal arms 60.

Figure 6:
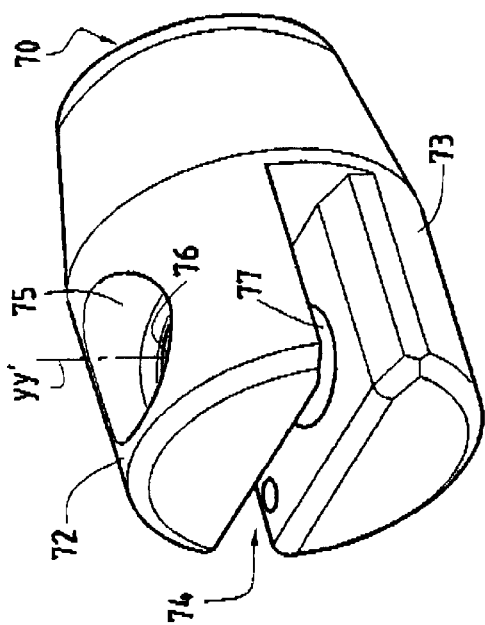
FIG. 6 is a partial perspective view of one of the main elements of the system of the invention.
Figure 5:
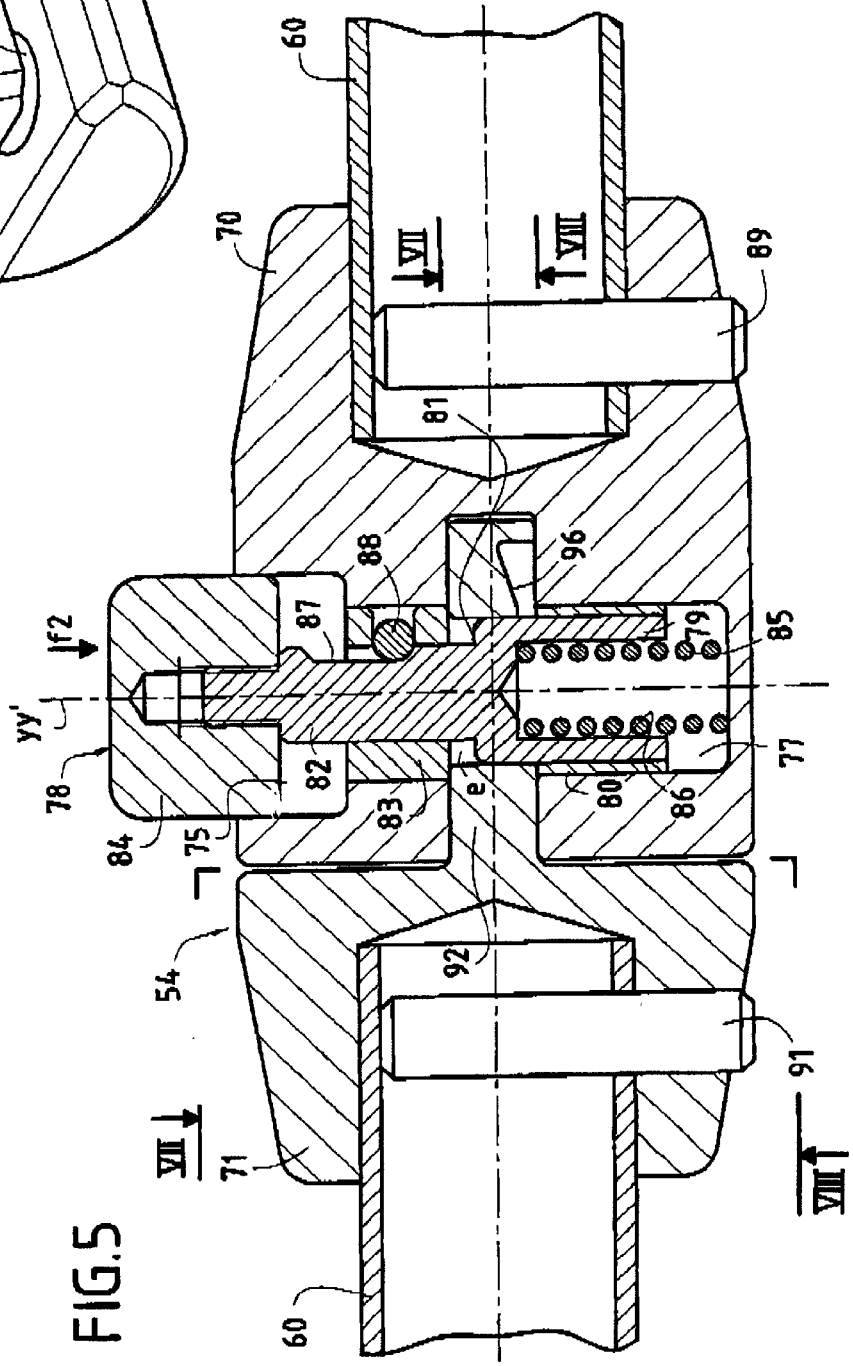
FIG. 5 is an elevation cutaway view taken on larger scale taken along the line V—V of FIG. 3.
Figure 7:
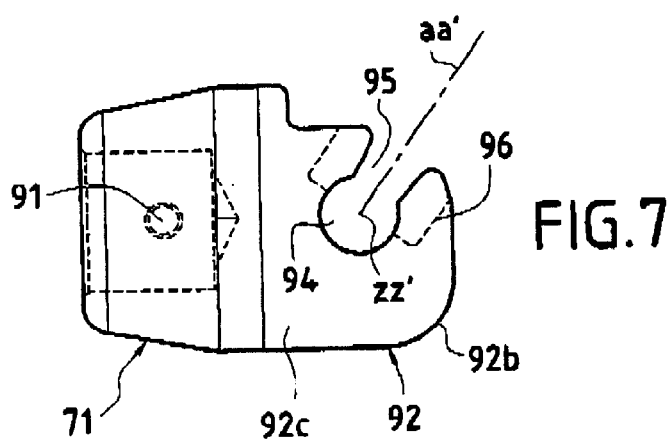
FIGS. 7 and 8 are bird's eye views taken respectively on smaller scale along the broken lines VII—VII and VIII—VIII of FIG. 5.

As shown more particularly on FIGS. 5 and 6, the half nut 70 is embodied so as to delimit two cheeks 72 and 73, respectively the upper and lower, which together delimit an open diametral mortice 74 whose general plane can be qualified as horizontal by a similar comparison with the installation of the means 27, as shown on FIGS. 1 et 2.

The upper cheek 72 is traversed by a clearance hole constituted by a countersinking 75 made from the top of the upper cheek 72 and which communicates with a bore 76 of smaller diameter which opens in the face of the cheek delimiting the mortice 74 which can also be qualified as a groove.

The countersinking 75 and the bore 76 are coaxial with respect to each other along an axis y–y' as well as with a dummy hole 77 embodied in the lower cheek 73 from the face of the latter contributing in delimiting the mortice or groove 74. The axis y-y' is perpendicular to the median plane of the mortice 71.

The half nut 70 contains an elastic return thrustor 78 which forms a body 79, preferably cylindrical, partly engaged in the hole 77 in which it can be guided by a ring 80. The body 79 is prolonged beyond a shoulder 81 by a neck 82, also preferably cylindrical, which is guided inside the bore 76 by a ring 83. The neck 82 is provided with an activation button 84 partly placed inside the countersinking 75 and projecting outwardly above the upper cheek 72.

The elastic return thrustor is associated with a spring 85 of the helical type working on compression and which is stressed between the bottom of the hole 77 and the bottom of a dummy bore 86 shown by the body 79.

The action of the spring 85 is again to push the thrustor 78 so that the body 79 partly traverses the mortice 74 by leaving between the shoulder 81 and the plane of the face of the cheek 72 contributing in delimiting the mortice 74 a gap e whose function appears in the following. The spring 85 is also provided so as to allow by acting in the direction of the arrow $f_2$ on the button 84 an axial sliding of the thrustor so as to retract the body 79 with respect to the mortice 74.

The extreme positions given to the thrustor 84 can advantageously be determined by providing on the neck 82 a clearance 87 in which a pin 88 is continuously engaged which contributes in angularly and axially immobilising there ring 83 in the bore 76.

The half nut 70 can be suitably adapted on the end portion of the arm 60 and for example by interposing a diametral pin 89.

The immobilisation, system 54 of the invention further includes the half nut 71 which is formed, as indicated in FIGS. 5, 7, 8 and 9 to be adapted on the corresponding end portion of the second member 60, also for example with the aid of a pin 91.

The half nut 72 is embodied to comprise a tenon 92 extending inside a plane approximately horizontal as compared with the same reference as the one used to characterise the mortice 74. The dimensional characteristics of the tenon 92 are such that it can be engaged in the mortice 74 and forms with the latter an assembly qualified as a tenon and mortice type assembly shown on FIG. 5, but which could also be qualified as a groove and tongue type assembly.

The tenon has a traversing housing 94 having a circular shape with an axis z–z' perpendicular to the plane of the tenon. The traversing housing is thus orientated perpendicular to the assembly plane defined above in the same respect as the general axis y–y' passing through the bore 76 and the hole 77.

The tenon 92 is moreover embodied so as to comprise an engagement corridor 95 opening towards the front on account of the position occupied by the member 60 in a state of alignment with the additional member in which the elastic stockings 50 cover the legs J. The chute 95 can have parallel edges or advantageously be convergent in the direction of the housing 94 in which the corridor opens via a cross section which is almost equal, indeed slightly larger, that the diameter of the neck 82, whereas the diameter of the housing 94 is equal, indeed slightly larger, than that of the cylindrical body 79. Furthermore, the axis a–a' of the guiding or engaging chute 95 is orientated slanted so as to be next to the tangential point with the geometrical locus L which is described by the axis y–y' during tilting of the member 52 bearing the half nut 70 from its opening position to the nesting position of the elastic stocking 50 it bears.

Figure 8:
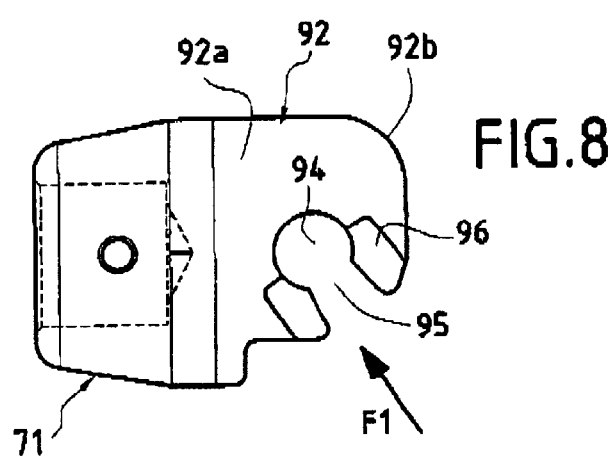
Figure 9:
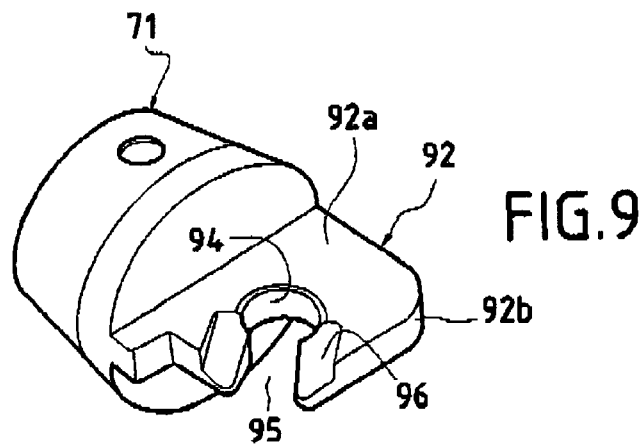
FIG. 9 is a perspective view corresponding approximately to a view taken according to the arrow $F_1$ of FIG. 8.

As shown in particular on FIGS. 8 and 9, the tenon 92 is moreover embodied so as to comprise on its lower face 92a and in relation with the edges or borders corresponding to the guiding engaging chute 95 at least one and preferably two ramps 96 which are slanted in a direction for which, starting from the lower face 92a of the tenon 92 they end approximately on the peripheral edge 92b of the tenon and close to the upper face 92c.

The residual thickness existing at the right of the peripheral edge 92b, is close to, indeed smaller, that the gap e allowed to exist as said earlier via the production of the shoulder 81 in the mortice in the extension position of the thrustor 78 under the action of the elastic return element 85.

The means above are able to take up the following functions.

In the cooperation position as shown on FIG. 6, the tenon 92 is placed in the mortice 74 with alignment of the axes y–y' and z–z'. The portion of the locking body 79 extending from the shoulder 81 is engaged in the housing 94 in a stop position which is determined by the action of the elastic element 85 establishing cooperation between the clearance 87 and the pin 88.

Figure 4:
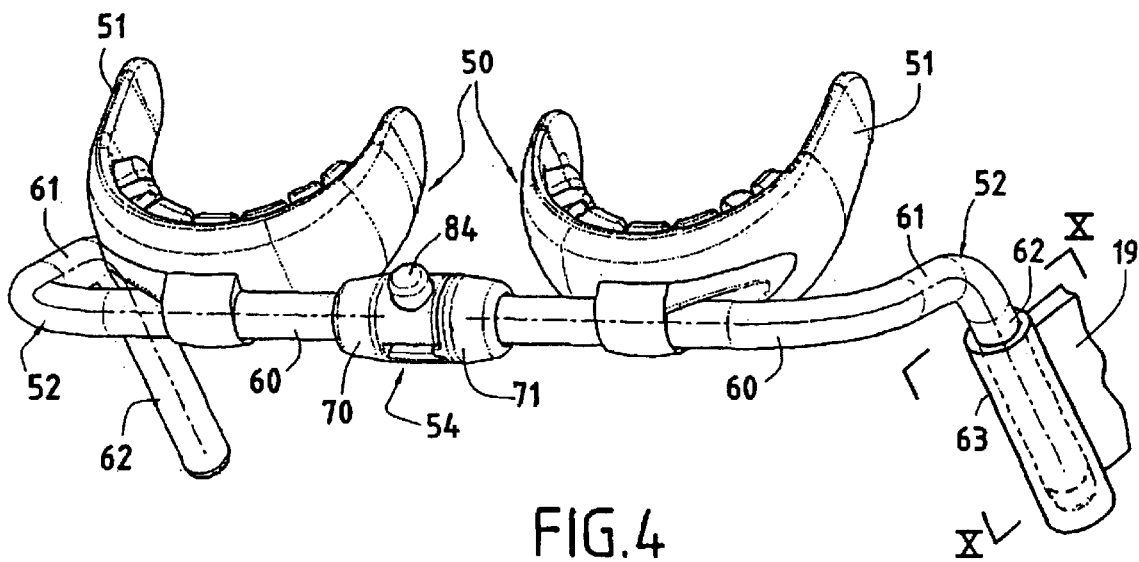
FIG. 4 is a partial perspective view taken on larger scale along the direction of the arrow F on FIG. 2.

In this position, also shown on FIGS. 3 and 4, the button 84 partly projects onto the top of the half nut 70 and consequently represents a visual indicator of the proper engagement of the thrustor 78 in locking cooperation with the housing 94.

In fact, any attempt to open any one of the members 52 via pivoting in the direction of the arrows $f_1$ is prevented by the locking body 79 being unable to be engaged in the guiding chute 95 given the fact that the passage section of the latter is smaller than the diameter of the locking body 79.

Thus, any ill-timed opening cannot occur.

In order to open the body support means 27, action in the direction of the arrow $f_2$ needs to be exerted on the button 84 to drive in the thrustor 78 against the action of the elastic element 85 for example as far as the stop position determined by the cooperation of the clearance 87 and the pin 88.

In this stop position, the shoulder 81 is retracted with respect to the mortice 74 so that only the neck 82 exists and can be engaged, for example by pivoting the member 52 bearing the half nut 70 in the direction of the arrow $f_1$ in the chute 95 which, owing to the inclination of its axis a–a', authorises disengaging resulting in opening of the corresponding elastic stocking 50 freeing the leg J.

Unlocking at the right of the thrustor 78 makes it possible to subject the second member 52 to a movement via pivoting in the corresponding direction.

When it is appropriate to place the body support means 27, it merely suffices to pivot the member 52 bearing the half nut 71 in the opposite direction of the arrow $f_1$ so as to bring it into the nesting position of the leg J by the corresponding open elastic stocking 50. In this situation, the frontal arm generally occupies the sagittal plane so that the guiding chute 95 is orientated towards the front on account of the wheelchair provided by the body support device.

Then it suffices to subject the member 52 bearing the half nut 70 to a similar pivoting so that the axis y–y' follows the geometrical locus L (FIG. 3) resulting in the shoulder 81 taking support under the engaging ramp(s) 96 via the penetration of the latter into the gap e.

The continuation of the movement imposed on the member 52 results in cooperation between the shoulder 81 and the ramps 96 which push back the thrustor 78 in the direction of the arrow $f_2$ against the action of the element 87.

At the end of engaging, the ramps 96 have pushed back the shoulder 81 so that the latter has retracted or is situated approximately inside the plane of the corresponding face of the cheek 73 so that the neck 82 can be fully engaged in the chute 95 until coincidence is established between the axes y–y' and z–z'. In this condition, the action of the spring 85 then pushes back the thrustor 78 in the opposite direction of the arrow $f_2$ and the shoulder 81 brings about engagement of the locking body 79 in the housing 94.

In this condition, the button 84 again occupies the projecting position with respect to the top of the half nut 70, a projecting position which constitutes a visual indicator of the proper locking of the immobilisation means of the locking system 54.

Figure 10:
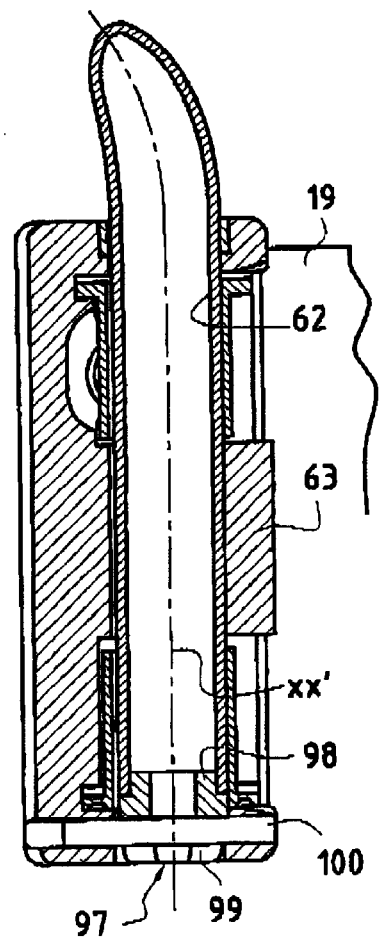
FIG. 10 is a section on larger scale taken along the plane X—X of FIG. 4.

So as to offer passive safety in a case where inadvertently or owing to malfunctioning the means of the locking system constituted by the half nuts 70 and 71 were to become or would be inoperative, the locking system described above can be completed by introducing, at least for one of the members 52, an indexing device shown more particularly on FIG. 10 and denoted in its entirety by the reference 97.

The indexing device 97 includes an end piece 98 which is mounted at the extremity of the arm 63 and which has a standard diametral index notch 99 delimited transversally in an appropriate way so as to cooperate with a pin or finger 100 mounted solidly at the base of the pivot 63 which forms part of the upright 19 of the foot-rest 18.

As shown on FIG. 3, the respective positions of the notch(es) 99 and the pin or finger 100 are determined so that a relative nesting occurs between these two elements when the corresponding member 52 is arranged so that the arm 60 occupies the sagittal plane in a position in which the elastic stocking 50 covers the leg J.

In this way, if the safety locking system 54 for any reason becomes inoperative, any possible ill-timed opening of the body support device can at best no longer occur as regards the member 52 bearing the half nut 70 given the fact that the member 52 bearing the half nut 71 is angularly blocked by the relative engaging between the notch(es) 99 and the pin 100.

So as to fully free the legs of the occupant, user or an attendant, action needs to be taken on the member 52 so as to order an axial rising of the arm 62 with respect to the tubular pivot 63 up to a height making it possible to disengage the notch 99 with respect to the pin 100 and thus permit an angular pivoting freeing.

It is important to mention that the passive safety system can, if required, be provided on the two half members 52.

Figure 12:
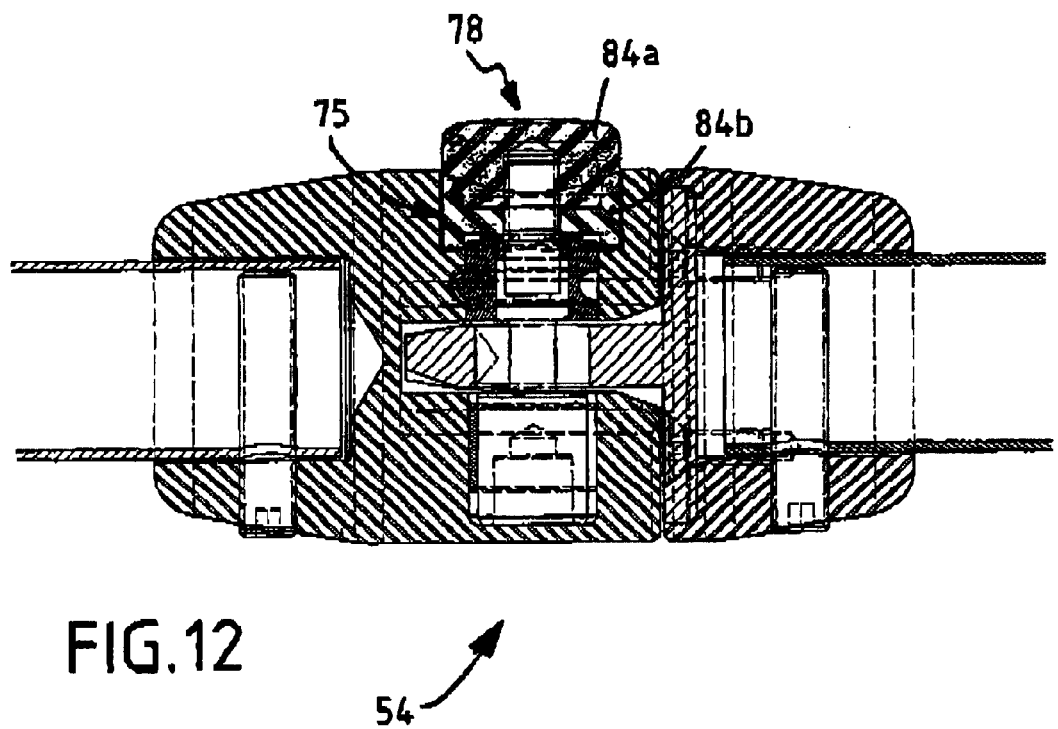

FIGS. 11 and 12 illustrate a variant consisting of embodying the button 84 with the aid of two superimposed elements 84$_a$ and 84$_b$ fixed at the end of the neck 82 and having two different colours, such as red for the element 84$_a$ and green for the element 84$_b$.

The thickness of the element 84$_b$ is selected so that it is fully retracted in the countersinking 75 in the position of the thrustor 78 freeing the tenon 92 of the mortice 74 (FIG. 12), but on the other hand it is at least partly apparent with respect to the cheek 72 in the position where the pressure 78 establishes the link between the half nuts 70 and 71 (FIG. 11).

In this way, the user of the wheelchair immediately interprets when the element 84$_b$ is visible that the locking system 54 is in the real safety closing position, whereas when only the element 84*a* is visible, said user visually perceives that the link established by the half nuts is unsafe.

The invention is not limited to the examples described and shown above as various modifications can be made without departing from the context of the invention.

What is claimed is:

1. Locking system for a body support device for a stand-up wheelchair including a chassis (21) supporting an articulated structure (12) composed of a seat (13), a back portion (16) and a foot-rest (18) associated with two open elastic stockings (50) constituted by two cradles borne by supports with an articulation function via pivoting on the foot-rest and a locking system (54) intended to firstly immobilize between said supports in a position in which the elastic stockings nest the legs (J) of an occupant (S), and secondly allow opening of the supports constituted by two members (52) forming two articulated arms (62) and two frontal arms (60) provided at the end of additional constitutive elements of the locking system, wherein the additional elements are constituted by half nuts (70, 71) shaped in such a way so as to produce in their cooperation position a tenon (92) and mortice (74) assembly inside an approximately horizontal plane, one of the half nuts delimits in the tenon (92) an opening (94, 95) with an axis perpendicular to an assembly plane and into which a guiding slot projects opening towards the front, and the other half nut bears an elastic return thrustor (78) traversing the mortice along a direction perpendicular to the assembly plane and forming a body (79) engaged in the housing and having a neck (82) which traverses the slot.

2. Locking system according to claim 1, characterized in that:

the tenon (92) comprises a lower face (92*a*) having at least one slanted ramp (96), the thrustor (78) forms in a liaison zone between the body (79) and the neck (82) an annular shoulder (81) able to cooperate with the slanted ramp during the engagement between the tenon and the mortice and against the action of the elastic return movement, pushes back the shoulder inside a plane corresponding to the lower face of the tenon until it is brought in where the axis of the body (y–y') and the axis of the housing (z–z') coincide in which said body is automatically engaged by the action of the elastic return movement.

3. Locking system according to claim 1, characterized in that the neck (82) has a clearance (87) cooperating with a pin (88) borne by the half nut (70) and with which it defines two extreme positions for the thrustor (78), one under the action of the elastic return movement in which the shoulder (81) partly traverses the mortice (74) and the other in which, when maneuvered by a manual action opposing the action of the elastic return movement, said shoulder is retracted from the mortice.

4. Locking system according to claim 1, characterized in that the housing (94) has a circular shape and in that the body of the thrustor (79) has a cylindrical shape.

5. Locking system according to claim 1, characterized in that the thrustor body (79) delimits opposite the neck a dummy bore (86) containing a return spring (85) placed under compression stress as compressed against the bottom of a hole (77) presented by the half nut (70) and in which said body is partly engaged.

6. Locking system according to claim 1, characterized in that the the neck (82) is guided in a ring (83) immobilized in the half nut by a pin (88).

7. Locking system according to claim 1, further comprising an activation button (84) against the action of the elastic return.

8. Locking system according to claim 7, characterized in that the button (84) is partly housed in a countersinking (75) of the half nut.

9. Locking system according to claim 7, characterized in that the button is accessible on the top of the half nut.

10. Locking system according to claim 8, characterized in that the button is constituted by two superimposed elements (84*a*) and (84*b*) of different colors.

11. Locking system according to claim 10, characterised in that the button (84) is constituted by two elements (84$_a$) and (84$_b$), the thickness of the latter being such that it is fully retracted in the countersinking (75) in the position of the thrustor freeing the half nuts, whereas it is partly visible outside the half nut in the position in which said thrustor establishes locking between the half nuts.

12. Locking system according to claim 1, characterized in that the tenon (92) delimits a corridor (95) having an axis (a–a') oriented so as is in a nesting position with the corresponding elastic stocking, and tangent to the geometrical locus (L) defined by the axis (z–z') of the thrustor (78) the corresponding member (52) pivots in the direction of the nesting position of the elastic stocking it bears.

13. Locking system according to claim 1, characterized in that one of the two members (52) each is associated with a device (97) for indexing its angular pivoting position corresponding to nesting of the elastic stocking it bears.

14. Locking system according to claim 12, characterised in that the member associated with the angular indexing device is the member bearing the half nut (71) forming the tenon (92).

15. Locking system according to claim 13, characterized in that the indexing device (97) is constituted by a notch (99) provided in the pivoting arm (62) of the two members (52) and by a finger (100) borne by the pivot pin (63) cooperating with the pivoting arm.

16. Locking system according to claim 15, characterised in that the pivot pin is tubular and is borne by the foot-rest.

\* \* \* \* \*